United States Patent
Chang et al.

(10) Patent No.: US 11,016,617 B2
(45) Date of Patent: May 25, 2021

(54) TOUCH SENSITIVE PROCESSING METHOD AND APPARATUS AND TOUCH SENSITIVE SYSTEM

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 0 days.

(21) Appl. No.: 16/846,646

(22) Filed: Apr. 13, 2020

(65) Prior Publication Data

US 2020/0326795 A1  Oct. 15, 2020

Related U.S. Application Data

(60) Provisional application No. 62/833,092, filed on Apr. 12, 2019.

(30) Foreign Application Priority Data

Dec. 31, 2019 (TW) .................... 108148746

(51) Int. Cl.
*G06F 3/041* (2006.01)
*G06F 3/044* (2006.01)

(52) U.S. Cl.
CPC ............ *G06F 3/044* (2013.01); *G06F 3/0446* (2019.05); *G06F 3/04166* (2019.05)

(58) Field of Classification Search
CPC ............... G06F 3/0416; G06F 3/04166; G06F 3/041661; G06F 3/044; G06F 3/0446
See application file for complete search history.

(56) References Cited

U.S. PATENT DOCUMENTS

| | | | | |
|---|---|---|---|---|
| 8,913,041 B2* | 12/2014 | Fukushima | ........... | G06F 3/0416 345/179 |
| 9,041,678 B2* | 5/2015 | Sugita | ................... | G06F 3/0446 345/173 |
| 9,046,978 B2* | 6/2015 | Katsurahira | .......... | G06F 3/0443 |
| 9,207,823 B2* | 12/2015 | Baek | ..................... | G06F 3/0446 |
| 9,329,742 B2* | 5/2016 | Yi | ............................ | G06F 3/0448 |
| 9,442,612 B2* | 9/2016 | Kuroiwa | ........... | G06F 3/041661 |
| 9,507,470 B2* | 11/2016 | Jung | ..................... | G06F 3/0446 |
| 9,753,588 B2* | 9/2017 | Tsai | ....................... | G09G 5/003 |
| 9,798,435 B2* | 10/2017 | Chen | ....................... | G06F 3/046 |

(Continued)

*Primary Examiner* — Gene W Lee
(74) *Attorney, Agent, or Firm* — WPAT, PC (57) ABSTRACT

A touch sensitive processing method, comprising: selecting a detection area including N first electrodes; repeating following steps N times: designating N−1 of the first electrodes among the N first electrodes as a i-th combination, where i is a positive integer ranged from 1 to N; simultaneously applying driving signals to the first electrodes designated as the i-th combination in a first time period; and retrieving i-th period one-dimension sensing information based on sensed induced driving signals of the second electrodes; adding all of the i-th period one-dimension sensing information to generate one all-period one-dimension sensing information; and calculating a two-dimension sensing information according to the all-period one-dimension sensing information and all of the i-th period one-dimension sensing information.

23 Claims, 4 Drawing Sheets

(56) References Cited

U.S. PATENT DOCUMENTS

| | | | |
|---|---|---|---|
| 10,120,498 B2* | 11/2018 | Gray | G06F 3/03545 |
| 10,296,108 B2* | 5/2019 | Gray | G06F 3/0346 |
| 10,353,518 B2* | 7/2019 | Petrovic | G06F 3/0418 |
| 10,540,043 B2* | 1/2020 | Tanemura | G06F 3/041662 |
| 10,572,092 B2* | 2/2020 | Shimizu | G06F 3/045 |
| 10,613,677 B2* | 4/2020 | Cho | G06F 3/0445 |
| 10,712,867 B2* | 7/2020 | Li | G06F 3/0412 |
| 2009/0251434 A1* | 10/2009 | Rimon | G06F 3/0445 345/173 |
| 2012/0113071 A1* | 5/2012 | Kawaguchi | G06F 3/0443 345/204 |
| 2014/0049705 A1* | 2/2014 | Sugita | G06F 3/04166 349/12 |
| 2014/0292682 A1* | 10/2014 | Kida | G06F 3/0418 345/173 |
| 2015/0091859 A1* | 4/2015 | Rosenberg | G06F 3/0445 345/174 |
| 2015/0346870 A1* | 12/2015 | Oh | G06F 1/3262 345/174 |
| 2017/0115824 A1* | 4/2017 | Katsurahira | G06F 3/0446 |
| 2017/0242502 A1* | 8/2017 | Gray | G06F 3/0441 |
| 2018/0088735 A1* | 3/2018 | Lin | G06F 3/0412 |
| 2020/0012408 A1* | 1/2020 | Drumm | G06F 3/0428 |
| 2020/0183564 A1* | 6/2020 | Song | G06F 3/0443 |

* cited by examiner

TOUCH SENSITIVE PROCESSING METHOD AND APPARATUS AND TOUCH SENSITIVE SYSTEM

CROSS REFERENCE TO RELATED APPLICATIONS

This application claims priority to U.S. provisional patent application, 62/833,092, filed on Apr. 12, 2019 and to Taiwan patent application No. 108148746, filed on Dec. 31, 2019, the disclosures of which are incorporated herein by reference.

BACKGROUND OF THE INVENTION

1. Field of the Invention

The present invention relates to touch detection, and more particularly, to a touch sensitive processing method based on mutual capacitance sensing.

2. Description of the Prior Art

Touch screen or touch panel is one of the most popular input/output interface of modern electronics. When sizes of touch screens become more and more large, number of touch electrodes of touch screens increases accordingly. It is getting slow to scan external conductive objects on touch screens. How to accelerate the scans of touch screens in order to maintain or even to increase report frequency of the scans is what the present application wants to solve.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

The present application provides a touch sensitive processing method, applicable to a touch panel including multiple first electrodes in parallel to a first direction and multiple second electrodes in parallel to a second direction, the touch sensitive processing method comprising: selecting a detection area which includes N of the first electrodes, where N is a positive integer larger than 2; repeating following steps N times: designating N−1 of the first electrodes among the N first electrodes as a i-th combination, where i is a positive integer ranged from 1 to N; simultaneously applying driving signals to the first electrodes designated as the i-th combination in a first time period; and retrieving i-th period one-dimension sensing information based on sensed induced driving signals of the second electrodes, wherein the i-th combination and a j-th combination are corresponding to different combination of the selected first electrodes, where j is a positive integer ranged from 1 to N, i does not equal to j; adding all of the i-th period one-dimension sensing information to generate one all-period one-dimension sensing information; and calculating a two-dimension sensing information according to the all-period one-dimension sensing information and all of the i-th period one-dimension sensing information.

According to an embodiment of the present invention, a touch sensitive processing apparatus is provided. The touch sensitive processing apparatus is configured for controlling a touch panel, which includes multiple first electrodes in parallel to a first direction and multiple second electrodes in parallel to a second direction. The touch sensitive processing apparatus comprising: a driving circuit module; a sensing circuit module; an interconnection network module, which is configured to connect the driving circuit module to any one or more of the first electrodes and to connect the sensing circuit module to any one or more of the second electrodes; and a processor module, configured to execute programs stored in non-volatile memory to realize the following steps: selecting a detection area which includes N of the first electrodes, where N is a positive integer larger than 2; repeating following steps N times: designating N−1 of the first electrodes among the N first electrodes as a i-th combination, where i is a positive integer ranged from 1 to N; simultaneously applying, by the driving circuit module, driving signals to the first electrodes designated as the i-th combination in a first time period; and retrieving, by the sensing circuit module, i-th period one-dimension sensing information based on sensed induced driving signals of the second electrodes, wherein the i-th combination and a j-th combination are corresponding to different combination of the selected first electrodes, where j is a positive integer ranged from 1 to N, i does not equal to j; adding all of the i-th period one-dimension sensing information to generate one all-period one-dimension sensing information; and calculating a two-dimension sensing information according to the all-period one-dimension sensing information and all of the i-th period one-dimension sensing information.

According to one embodiment of the present invention, a touch sensitive system provided by the present application comprising: the aforementioned touch panel and the touch sensitive processing apparatus.

Comparing with traditional mutual-capacitance detection, the touch sensitive processing method, apparatus and touch sensitive processing system provided by the present invention may spends constant time on arithmetic operations and saves sensing time $$\left(N - \frac{N}{N-1}\right)T.$$

When N grows, more sensing time it may save. The advantage provided by the present invention is to accelerate scans of touch panel or touch screen and to increase frequency of scan result report.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 1:
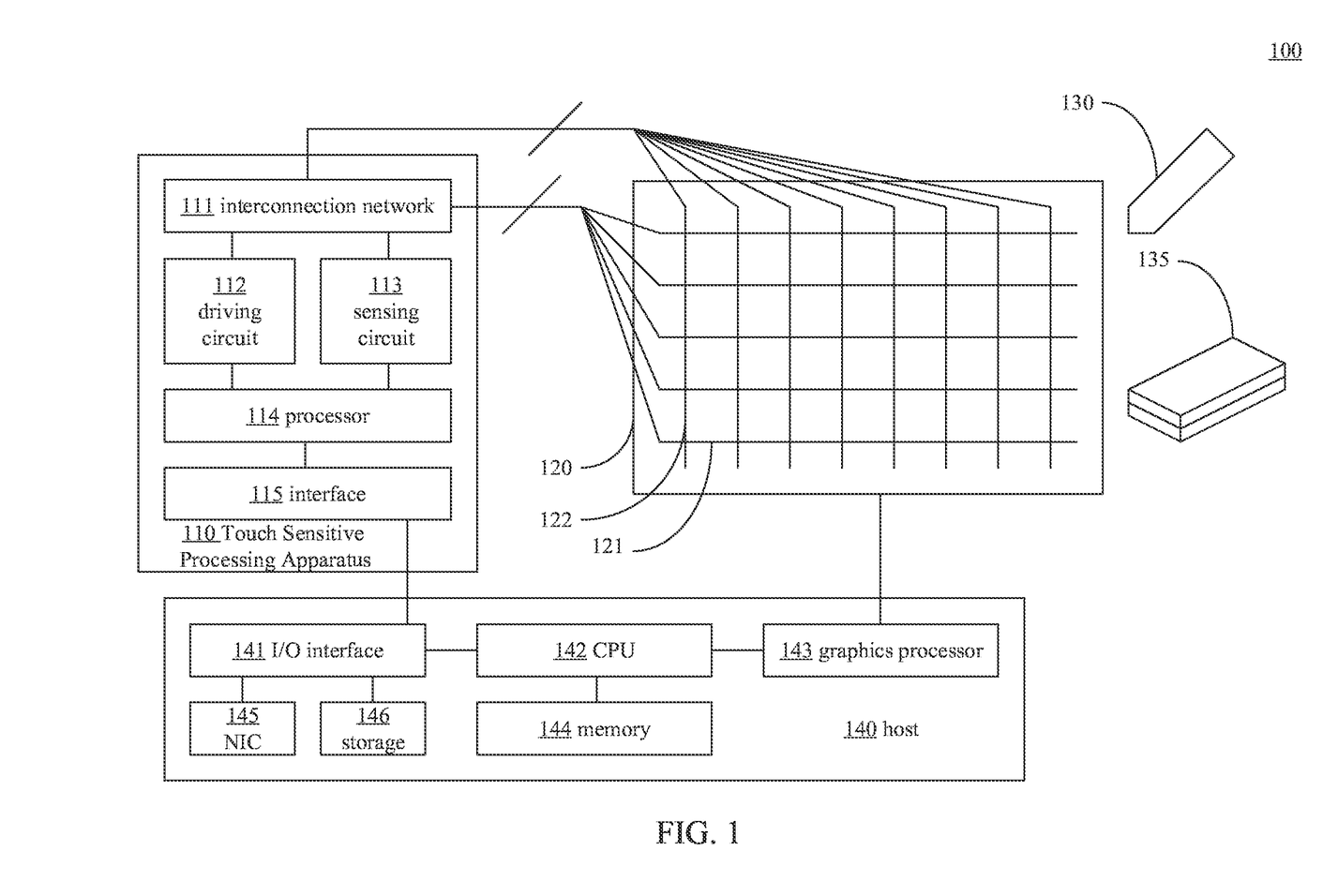
FIG. 1 is a schematic diagram shows a touch system in accordance with one embodiment of the present application.

Please refer to FIG. 1, which is a schematic diagram shows a touch system 100 in accordance with one embodiment of the present application. The touch system 100 may be normal desktop, laptop, pad-like personal computer, and industrial computer for control, smartphone or any other forms of computer systems having touch functions.

The touch system 100 may comprises a touch sensitive processing apparatus 110, a touch panel or a touch screen 120 connecting to the touch sensitive processing apparatus 110, and a host 140 connecting to the touch sensitive processing apparatus 110. Hereafter in the present application, the touch panel or the touch screen 120 is collectively called touch screen 120. However, if it is implemented in embodiments which are lack of display function, person with ordinary skill in the art can understand the touch screen referred by the present application is actually the touch panel.

The touch screen 120 comprises multiple first electrodes 121 parallel to a first axis and multiple second electrodes 122 parallel to a second axis. The first electrode 121 may be intersected with multiple second electrodes 122 in order to form multiple sensing points or sensing areas. Analogously, the second electrode 122 may be intersected with multiple first electrodes 121 in order to form multiple sensing points or sensing areas. In some embodiment, the present application may use a term "first touch sensitive electrodes" 121 instead of first electrodes 121 and may use another term "second touch sensitive electrodes" 122 instead of second electrodes. Collectively, the first electrodes 121 and the second electrodes 122 may be referred as "touch sensitive electrodes" in the present application. In some embodiments of touch screens 120, the first electrodes 121 and the second electrodes 122 are made of transparent material. The first electrodes 121 and the second electrodes 122 may be arranged in the same electrode layer, multiple conductive sheets of each of the first electrodes 121 or each of the second electrodes 122 are connected by circuit bridges. The first electrodes 121 and the second electrodes 122 may be arranged in different stacked electrode layers. Unless specially noted, the present application may be applicable to embodiments having a single electrode layer or having two electrode layers. The first axis is usually perpendicular to the second axis. However, the present application does not limit that the first axis must be perpendicular to the second axis. In one embodiment, the first axis is the horizontal axis, or pixel refreshing axis of the touch screen 120.

The touch sensitive processing apparatus 110 may comprise following hardware circuit modules: an interconnection network module 111, a driving circuit module 112, a sensing circuit module 113, a processor module 114, and an interface module 115. The touch sensitive processing apparatus 110 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 110 and the host 140 may be implemented in the same integrated circuits, or in the same chip. In other words, the present application does not limit how to implement the touch sensitive processing apparatus 110.

The interconnection network module 111 is configured to connect each of the multiple first electrodes and/or the multiple second electrodes of the touch screen 120. The interconnection network module 111 may accept control command of the processor module 114 for connecting the driving circuit module 112 and any one or more touch electrodes and for connecting the sensing circuit 112 and any one or more touch electrodes. The interconnection network module 111 may include a combination of one or more MUX to realize the aforementioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise clock generator, frequency divider, frequency multiplier, phase lock loop, power amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor module 114 may comprises processors widely adopted in the industry such as 8051 series, Intel i960 series, ARM Cortex-M series and etc. The present application does not limit types and numbers of processors included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other modules of the touch sensitive processing apparatus 110. These instructions may include input/output interfaces of the processor module 114 to control other modules. Other modules may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the modules and the instructions.

The interface module 115 may include kinds of serial or parallel bus, such as universal serial bus (USB), I²C, peripheral component interconnect (PCI), PCI-Express, IEEE 1394 and other industrial standard input/output interface. The touch sensitive processing apparatus 110 connects to the host 140 via the interface module 115.

The touch system 100 may comprise one or more styli 130 and/or touch erasers 135. The stylus 130 and touch eraser 136 may be transmitters which emit electrical signals. The transmitters may include active transmitter which actively emits electrical signals or passive transmitter which emits electrical signals in response to outside electrical signals. The stylus 130 and touch eraser 136 may comprise one or more electrodes which is configured to receive electrical signals from the touch screen synchronously or asynchronously, or to transmit electrical signals to the touch screen synchronously or asynchronously. The electrical signals may be modulated according to one or more of the aforementioned modulation methods.

The stylus 130 or touch eraser 135 may be conductor which is configured to transmit driving signals or to be grounded via user's hand or body. The stylus 130 or touch eraser 135 may be wired or wirelessly connected to an I/O interface module 141 of the host 140 or any other underlying modules of the I/O interface module 141.

The touch sensitive processing apparatus 110 may detect one or more external conductive objects such as fingers, palms or passive styli 130 or touch erasers 135 or styli 130 or touch erasers 135 emitting electrical signals via the touch screen 120. The touch sensitive processing apparatus 110 may utilize mutual-capacitance or self-capacitance principles to detect external conductive objects. The styli 130 or touch erasers 135 and touch sensitive processing apparatus 110 may use the aforementioned modulation and demodulation methods to transmit message via the electrical signals. The touch sensitive processing apparatus 110 may detect one or more positions where the stylus 130 or touch erasers 135 touches or approximates the touch screen 120, status or sensors (pressure sensor or button) onboard the stylus 130 or touch eraser 135, orientation angle or inclination angle of the stylus 130 or touch erasers 135 with respect to the touch screen 120 and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and one storage module 146. The CPU module 142 may comprises one or more processor or processor cores. Common processors may include Intel, AMD, VIA's ×86 and ×64 instruction set architecture (ISA) processors, Apple, Qualcomm, Mediatek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware modules. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 2:
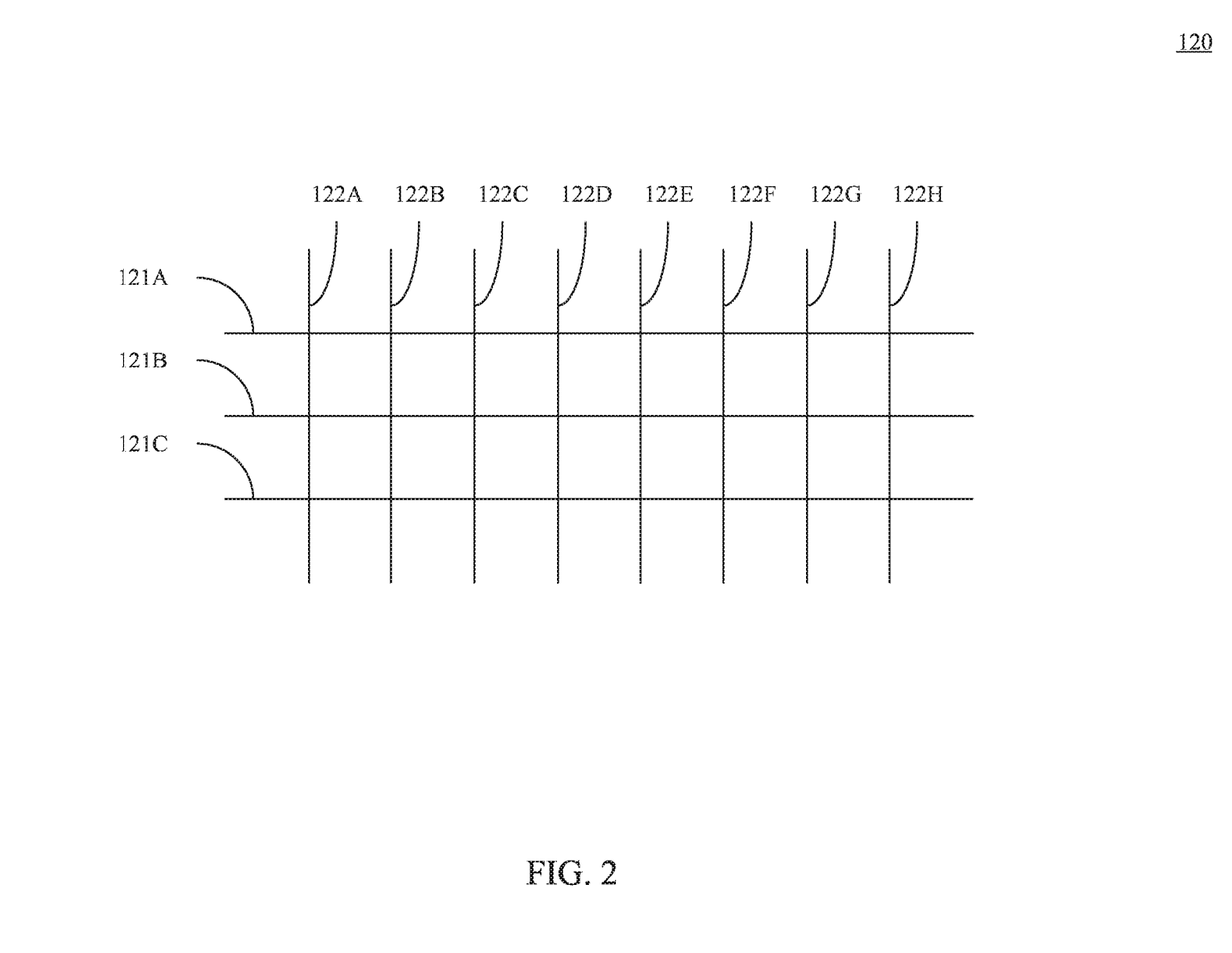
FIG. 2 is a schematic diagram depicts a touch screen according to one embodiment of the present application.

Please refer to FIG. 2, which shows a diagram of a touch screen according to an embodiment of the present application. For convenience, the touch screen 120 includes only three first electrodes 121. In a sequence, they are first electrodes 121A, 121B and 121C, respectively. The touch screen 120 comprises multiple second electrodes 122A~122H. Person having ordinary skill in the art can understand that the touch screen 120 may include N first electrodes, where N is a positive integer. In some embodiments, N is a positive integer larger than 10.

In traditional mutual-capacitance detection, the driving circuit module 112 would provide driving signals to one of the three first electrodes 121 in a time-sharing manner in order to gather three sets of one-dimension sensing information. Each set of one-dimension sensing information includes sensing results of each of the second electrodes 122. A two-dimension sensing information or a sensing image can be constructed according to the three sets of one-dimension sensing information and the driving signal transmission sequence with regard to the first electrodes 121. The processor module 114 is able to detect whether an external conductive object touches or approximates the touch screen 120 according to the two-dimension sensing information or the sensing image.

Assuming that each of the first electrodes 121 has to be driven during a length of time T, the sensing circuit module 113 can gather sufficient amount of signals. In the aforementioned traditional mutual-capacitance detection, it takes 3T length of time to scan the touch screen 120 once. To be generalized, in case there are N first electrodes 121 in the touch screen 120, it takes N×T length of time to scan the touch screen 120 once.

According to an embodiment of the present invention, a method for simultaneously scanning multiple first electrodes 121 is provided. Please refer to Table 1, which shows a timing sequence table in which the touch screen 120 as shown in FIG. 2 is scanned simultaneously.

TABLE 1

|  | First period | Second period | Third period | Total lengths of three periods |
| --- | --- | --- | --- | --- |
| Length of period | T/2 | T/2 | T/2 | 1.5T |
| First electrode 121A | driven | driven | | |
| First electrode 121B | driven | | driven | |
| First electrode 121C | | driven | driven | |
| Induced sources of driving signals | 121A + 121B | 121A + 121C | 121B + 121C | (121A + 121B + 121C) × 2 |

In the embodiment as shown in Table 1, driving and sensing operations are performed in three periods. However, length of each of the periods is T/2. In other words, during each period, the driving signal transmitted from each of the first electrodes 121 is not sufficiently accumulated amount of signal by the sensing circuit module 113. Nevertheless, after three periods, time length of transmitting driving signal by each of the first electrodes 121 is accumulated to T; it is sufficiently long for the sensing circuit module 113 to accumulate enough amount of signal.

During each of the periods, two of the first electrodes 121 transmit driving signals simultaneously. Hence, induced signals on any one of the second electrodes 122 accumulate induced energy of driving signals transmitted from two of the first electrodes 121. As shown in the last row of Table 1, induced sources of driving signals of any one of the second electrodes 122 can be found. For example, during the first period, induced sources of any one of the second electrodes 122 are came from the first electrodes 121A and 121B. During each of the periods, sensed signals from every second electrodes 122 construct a set of one-dimension sensing information.

After finishing the driving and sensing operations in these periods, a set of first period one-dimension sensing information, a set of second period one-dimension sensing information, a set of third period one-dimension sensing information are generated, respectively. Corresponding elements in these three sets of one-dimension sensing information are added, respectively, to generate a set of accumulated one-dimension sensing information. Value of any element in the set of accumulated one-dimension sensing information represents accumulated induced signals which is also corresponding to a sum of twice of driving signals the first electrodes 121A, 121B and 121C transmit in single one of the periods. After dividing the value of any element by 2, the value represents accumulated induced signals which is corresponding to a sum of driving signals the first electrodes 121A, 121B and 121C transmit in single one of the periods. After that, a difference between the half value of any element of the set of accumulated one-dimension sensing information and value of corresponding element of the set of first period one-dimension sensing information is corresponding to driving signals the first electrodes 121C transmit in single one of the periods. At last, a double of the difference is corresponding to driving signals the first electrodes 121C transmit in two of the periods.

In the same fashion, a difference between the half value of any element of the set of accumulated one-dimension sensing information and value of corresponding element of the set of second period one-dimension sensing information is corresponding to driving signals the first electrodes 121B transmit in single one of the periods. By multiply 2 on the difference, the result is corresponding to driving signals the first electrodes 121B transmit in two of the periods.

Similarly, a difference between the half value of any element of the set of accumulated one-dimension sensing information and value of corresponding element of the set of third period one-dimension sensing information is corresponding to driving signals the first electrodes 121A transmit in single one of the periods. By multiply 2 on the difference, the result is corresponding to driving signals the first electrodes 121A transmit in two of the periods.

Element values of the first period one-dimension sensing information, the second period one-dimension sensing information, and the third period one-dimension sensing information are denoted as $M_1$, $M_2$ and $M_3$. The accumulated value of the corresponding element of the accumulated one-dimension sensing information is denoted as $M_{total}$, which is a sum of $M_1+M_2+M_3$.

$$M_{total}=M_1+M_2+M_3 \quad (1)$$

Element value $M_C$ of the one-dimension sensing information corresponding to the first electrode 121C can be calculated as: $M_C=$ $$2 \times \left(\frac{M_{total}}{2} - M_1\right) = M_{total} - \frac{M_1}{2} \quad (2)$$

Element value $M_B$ of the one-dimension sensing information corresponding to the first electrode 121B can be calculated as:

$$M_B = 2 \times \left(\frac{M_{total}}{2} - M_2\right) = M_{total} - \frac{M_2}{2} \quad (3)$$

Element value $M_A$ of the one-dimension sensing information corresponding to the first electrode 121A can be calculated as:

$$M_A = 2 \times \left(\frac{M_{total}}{2} - M_3\right) = M_{total} - \frac{M_3}{2} \quad (4)$$

After the aforementioned calculations, one-dimension sensing information with regard to the first electrodes 121C, 121B and 121A can be generated according to the first period one-dimension sensing information, the second period one-dimension sensing information, and the third period one-dimension sensing information. The three element values of one-dimension sensing information with regard to the first electrodes 121A~C are corresponding to one second electrodes 122. In other words, three values corresponding to three points where the first electrodes 121A, 121B and 121C intersect with one of the second electrodes 122. The one dimension sensing information corresponding to multiple second electrodes can be used to construct a two-dimension sensing information or a sensing image. The processor module 114 is able to detect whether an external conductive object touches or approximates the touch screen 120 according to the two-dimension sensing information or the sensing image.

Comparing with traditional detection, in the equation (1), the embodiment needs to perform two extra addition operations in parallel to get the accumulated one-dimension sensing information. After that, in the equations (2), (3) and (4), three division and three subtraction operations are performed in parallel to get the sensing information with regard to three first electrodes 121. Since the denominators in the equations (2), (3) and (4) are 2, right shifting operations can be used instead of division operations. In summarized, comparing with the traditional mutual-capacitance detection method, the embodiment spends 8 additional arithmetic operations and saves sensing time 1.5T. Because the arithmetic operations performed by the processor module 114 is far faster than the sensing time of the sensing circuit module 113, and moreover, the processor module 114 usually has scalar parallel operation unit for performing multiple operations in parallel, it saves a lot of time for scanning the touch screen 120 once. Accordingly, it increases frequency of the touch sensitive processing apparatus 110 reports external conductive objects touching or approximating the touch screen 120 to the host 140.

According to an embodiment of the present invention, a method for simultaneously scanning multiple first electrodes 121, is provided, where N is a positive integer larger than 1, i is ranged from 1 to N. Please refer to Table 2, which shows a timing sequence table in which the touch screen 120 having N first electrodes 121 is scanned simultaneously.

TABLE 2

| | First period | Second Period | ... | N-th Period | Total lengths of N periods |
|---|---|---|---|---|---|
| Length of period | T/(N-1) | T/(N-1) | | T/(N-1) | $\frac{N}{N-1}T$ |
| First electrode $121_1$ | driven | driven | | | |
| First electrode $121_2$ | driven | | | driven | |
| ... | | | | | |
| First electrode $121_N$ | | driven | | driven | |
| Induced sources of driving signals | $121_1+$ $121_2+$ ...+ $121_{N-1}$ | $121_1+$ $121_3+$ ...+ $121_N$ | | $121_2+$ $121_3+$ ...+ $121_N$ | $(121_1+$ $121_2+$ ...+ $121_N)\times$ $(N-1)$ |

In the embodiment as shown in Table 2, the driving and sensing operations are performed in N periods. However, length of time in each period is T/(N-1). In other words, during each period, the driving signal transmitted from each of the first electrodes 121, is not sufficiently accumulated amount of signal by the sensing circuit module 113. Nevertheless, after N periods, time length of transmitting driving signal by each of the first electrodes $121_i$ is accumulated to T; it is sufficiently long for the sensing circuit module 113 to accumulate enough amount of signal.

During each of the periods, (N-1) of the first electrodes 121 transmit driving signals simultaneously. Hence, induced signals on any one of the second electrodes 122 accumulate induced energy of driving signals transmitted from (N-1) of the first electrodes 121. As shown in the last row of Table 2, induced sources of driving signals of any one of the second electrodes 122 can be found. For example, during the first period, induced sources of any one of the second electrodes 122 are came from the first electrodes $121_1$ and $121_{N-1}$. During each of the periods, sensed signals from every second electrodes 122 construct a set of one-dimension sensing information.

After finishing the driving and sensing operations in these N periods, N sets of i-th period one-dimension sensing information is generated. Corresponding elements in these N sets of one-dimension sensing information are added, respectively, to generate a set of accumulated one-dimension sensing information. Value of any element in the set of accumulated one-dimension sensing information represents accumulated induced signals which is also corresponding to a sum of (N-1) multiple of driving signals the first electrodes $121_1$ through $121_N$ transmit in single one of the periods. After dividing the value of any element by (N-1), the quotient value represents accumulated induced signals which is corresponding to a sum of driving signals the first electrodes $121_1$ through $121_N$ transmit in single one of the periods. After that, a difference between the quotient value of any element of the set of accumulated one-dimension sensing information and value of corresponding element of the set of first period one-dimension sensing information is corresponding to driving signals the first electrodes $121_N$ transmit in single one of the periods. A multiple of the difference and (N-1) is corresponding to driving signals the first electrodes $121_N$ transmit in (N-1) of the periods.

Element values of the i-th period one-dimension sensing information is denoted as $M_i$, the accumulated value of the corresponding element of the accumulated one-dimension sensing information is denoted as $M_{total}$, which may be presented as:

$$M_{total} = \Sum_1^N M_i \qquad (5)$$

Element value $X_i$ of the one-dimension sensing information corresponding to the first electrode $121_i$ can be calculated as:

$$X_i = (N-1) \times \left(\frac{M_{total}}{N-1} - M_{N-i+1}\right) = M_{total} - \frac{M_{N-i+1}}{(N-1)} \qquad (6)$$

After the aforementioned calculations, N sets of one-dimension sensing information with regard to the N first electrodes $121_i$ can be generated according to the N i-th period one-dimension sensing information. The N sets of one-dimension sensing information with regard to the N first electrodes $121_i$ can be used to construct a two-dimension sensing information or a sensing image. The processor module 114 is able to detect whether an external conductive object touches or approximates the touch screen 120 according to the two-dimension sensing information or the sensing image.

Comparing with traditional detection, in the equation (5), the embodiment needs to perform (N−1) extra addition operations in parallel to get the accumulated one-dimension sensing information. After that, in the equations (6), one division and two subtraction operations are performed in parallel to get the sensing information with regard to each of N first electrodes 121. In summarized, comparing with the traditional mutual-capacitance detection method, the embodiment spends constant time on additional arithmetic operations and saves sensing time $$\left(N - \frac{N}{N-1}\right)T.$$

For example, in case N is 10, it reduces 8.89T sensing time. When N is bigger, more sensing time it saves.

Because the arithmetic operations performed by the processor module 114 is far faster than the sensing time of the sensing circuit module 113, and moreover, the processor module 114 usually has scalar parallel operation unit for performing multiple operations in parallel, it saves a lot of time for scanning the touch screen 120 once. Accordingly, it increases frequency of the touch sensitive processing apparatus 110 reports external conductive objects touching or approximating the touch screen 120 to the host 140.

In one embodiment, the touch screen 120 may have H×N first electrodes 121, or the number of first electrodes 121 is more than (H−1)×N and less than H×N. Hence, H operations are required, where H is a positive integer. In each of the H operation, mutual capacitance detection with regard to N first electrodes 121 in order to get one-dimension sensing information with regard to the N first electrodes 121. After the H operations are performed, multiple one-dimension sensing information with regard to H×N first electrodes 121 are generated. The processor module 114 is able to detect whether an external conductive object touches or approximates the touch screen 120 according to the two-dimension sensing information or the sensing image.

In the embodiment, the N first electrodes 121 in each one of the operations may not be adjacent to each other. In order to alleviate electromagnetic interferences caused by fixed sequence of driving signal emission, non-adjacent first electrodes 121 may be chosen in each one of the H operations. Alternatively, adjacent first electrodes 121 are chosen in each one of the H operations, but the 2N first electrodes chosen in two consecutive operations may not be adjacent. The first electrodes 121 may be selected in random to alleviate electromagnetic interferences caused by fixed frequency of driving signal emission.

According to an embodiment of the present invention, a method for simultaneously scanning multiple first electrodes 121 is provided. Please refer to Table 3, which shows a timing sequence table that multiple scanning are simultaneously performed on the touch screen 120 as shown in FIG. 2.

TABLE 3

|  | First period | Second period | Third period | Total lengths of three periods |
| --- | --- | --- | --- | --- |
| Length of period | T/2 | T/2 | T/2 | 1.5T |
| First electrode 121A | driven | driven | driven inversely in phase |  |
| First electrode 121B | driven | driven inversely in phase | driven |  |
| First electrode 121C | driven inversely in phase | driven | driven |  |
| Induced sources of driving signals | 121A + 121B − 121C | 121A − 121B + 121C | −121A + 121B + 121C | (121A + 121B + 121C) |

In the embodiment as shown in Table 3, the driving and sensing operations are performed in 3 periods. However, length of time in each period is T/2. Comparing with the embodiment as shown in Table 1, during the first period, the driving signal emitted by the first electrode 121C is inversely in phase to the driving signal emitted by the first electrode 121A or 121B. Since the driving signal is cancelled by the inversed driving signal to the same receiving second electrode 122, during the first period, the induced driving signal of one of the second electrode 122 can be represented as 121A+121B−121C. In the same fashion, during the second period, the riving signal emitted by the first electrode 121B is inversely in phase to the driving signal emitted by the first electrode 121A or 121C. The induced driving signal of the same second electrode 122 can be represented as 121A−121B+121C. Similarly, during the third period, the riving signal emitted by the first electrode 121A is inversely in phase to the driving signal emitted by the first electrode 121B or 121C. The induced driving signal of the same second electrode 122 can be represented as −121A+121B+121C.

After finishing the driving and sensing operations in these three periods, a set of first period one-dimension sensing information, a set of second period one-dimension sensing information, a set of third period one-dimension sensing information are generated, respectively. Corresponding elements in these three sets of one-dimension sensing information are added, respectively, to generate a set of accumulated one-dimension sensing information. Value of any element in the set of accumulated one-dimension sensing information represents accumulated induced signals which is also corresponding to a sum of driving signals the first electrodes 121A, 121B and 121C transmit in single one of the periods. It can be represented as 121A+121B+121C.

A difference value between value of any element of the accumulated one-dimension sensing information and value of corresponding element of the first period one-dimension sensing information is corresponding to twice of driving signals the first electrode 121C transmits in signal one of the periods. After dividing the difference value by 2, the resulted value is corresponding to driving signals the first electrode 121C emits. In the same fashion, a difference value between value of any element of the accumulated one-dimension sensing information and value of corresponding element of the second period one-dimension sensing information is corresponding to twice of driving signals the first electrode 121B transmits in signal one of the periods. After dividing the difference value by 2, the resulted value is corresponding to driving signals the first electrode 121B emits. Similarly, a difference value between value of any element of the accumulated one-dimension sensing information and value of corresponding element of the third period one-dimension sensing information is corresponding to twice of driving signals the first electrode 121A transmits in signal one of the periods. After dividing the difference value by 2, the resulted value is corresponding to driving signals the first electrode 121A emits.

Element value $X_C$ of the one-dimension sensing information corresponding to the first electrode 121C can be calculated as:

$$X_C = (M_{total} - M_1)/2 \quad (7)$$

Element value $X_B$ of the one-dimension sensing information corresponding to the first electrode 121B can be calculated as:

$$X_B = (M_{total} - M_2)/2 \quad (8)$$

Element value $X_A$ of the one-dimension sensing information corresponding to the first electrode 121A can be calculated as:

$$X_A = (M_{total} - M_3)/2 \quad (9)$$

After the aforementioned calculations, one-dimension sensing information with regard to the first electrodes 121C, 121B and 121A can be generated according to the first period one-dimension sensing information, the second period one-dimension sensing information, and the third period one-dimension sensing information. The three sets of one-dimension sensing information with regard to the first electrodes 121A~C can be used to construct a two-dimension sensing information or a sensing image.

According to an embodiment of the present invention, a method for simultaneously scanning N first electrodes $121_i$ is provided, where N is an integer larger than 1 and i is between 1 and N. Please refer to Table 4, which shows a timing sequence table that multiple scanning are simultaneously performed on the touch screen 120 having N first electrodes.

TABLE 4

| | First period | Second period | ... | N-th period | Total lengths of N period |
|---|---|---|---|---|---|
| Length of period | T/(N-1) | T/(N-1) | T/(N-1) | | $\frac{N}{N-1}T$ |

TABLE 4-continued

| | First period | Second period | ... | N-th period | Total lengths of N period |
|---|---|---|---|---|---|
| First electrode $121_1$ | driven | driven | | driven inversely in phase | |
| First electrode $121_2$ | driven | driven inversely in phase | | driven | |
| ... | | | | | |
| First electrode $121_N$ | driven inversely in phase | driven | | driven | |
| Induced sources of driving signals | $121_1+$ $121_2+$ ...+ $121_{N-1}+$ $-121_N$ | $121_1+$ $121_3+$ ...+ $-121_{N-1}+$ $121_N$ | | $-121_1+$ $121_2+$ $121_3+$ ...+ $121_N$ | $(121_1+$ $121_2+$ ...+ $121_N)\times$ $(N-2)$ |

As of the embodiment shown in Table 3, in the embodiment shown in Table 4, during the i-th period, since inversed driving signal is emitted by the first electrode $121_{N-i+1}$, the element value $X_i$ of the one-dimension sensing information corresponding to the first electrode $121_i$ can be calculated as:

$$X_i = \left(\frac{N-2}{N}\right)(M_{total} - M_{N-i+1}) \quad (10)$$

After the aforementioned calculations, N sets of one-dimension sensing information with regard to the first electrode $121_i$ can be generated according to N sets of i-th period of one-dimension sensing information. Corresponding elements of the N sets of one-dimension sensing information with regard to the first electrodes $121_i$ are corresponding to one of the second electrodes 122. In other words, the N values of the corresponding elements are corresponding to N points where the first electrode $121_1$, $121_2$, ..., $121_N$ intersects with one of the second electrodes 122. Multiple sets of one-dimension sensing information with regard to the second electrodes 122 can also form two-dimension sensing information or sensing image. The processor module 114 is able to detect whether an external conductive object touches or approximates the touch screen 120 according to the two-dimension sensing information or the sensing image.

In the equation (10), two divisions and two subtractions are used to generate sensing value with regard to N first electrodes 121, respectively. In summarized, comparing with the traditional mutual-capacitance detection method, the embodiment spends additional arithmetic operation time and saves sensing time $$\left(N - \frac{N}{N-1}\right)T.$$

For example, in case N is 10, it reduces 8.89T sensing time. When N is getting bigger, more sensing time is saved.

Figure 3:
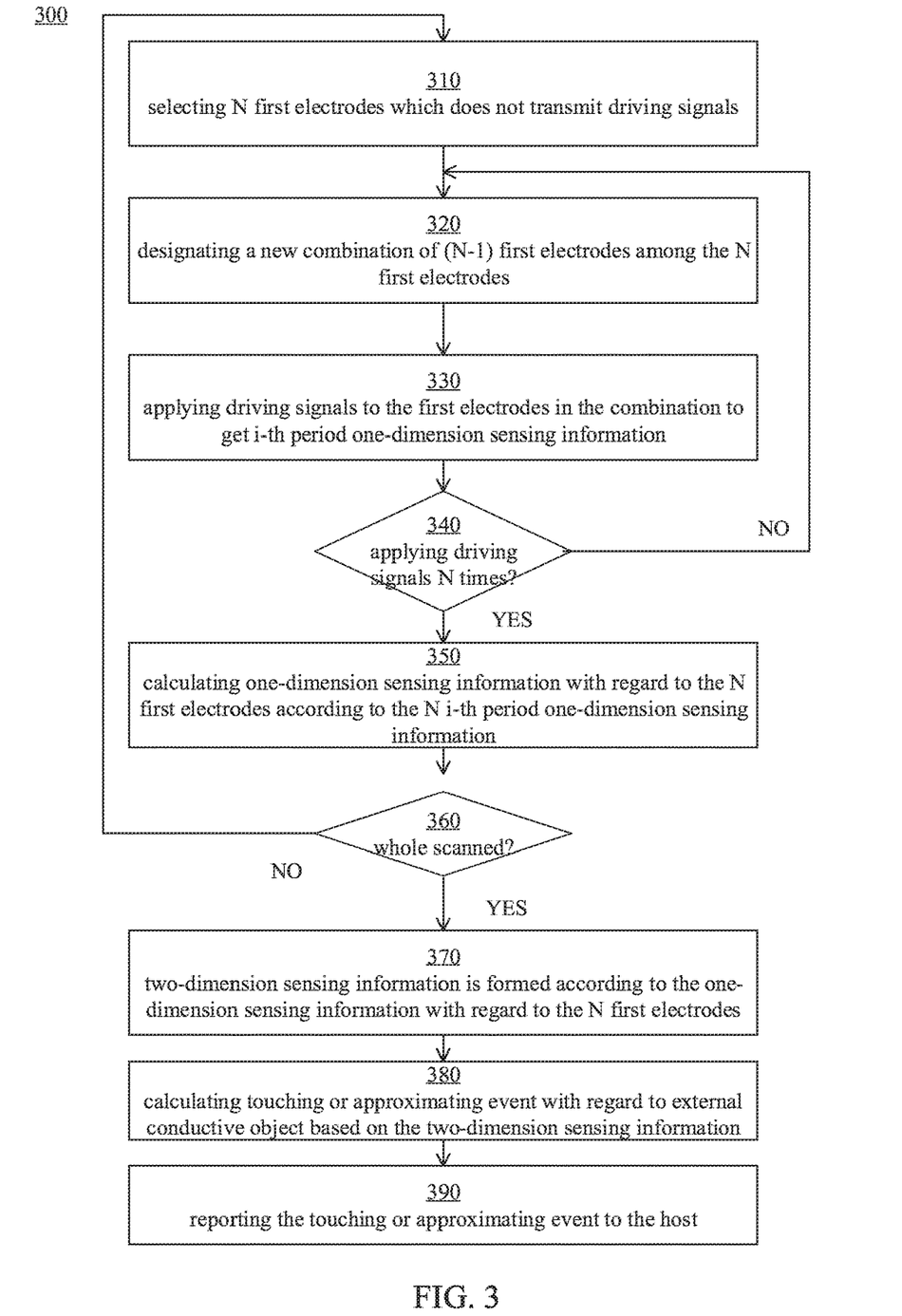
FIG. 3 is a flow chart diagram illustrates a mutual capacitance sensing method in accordance with one embodiment of the present application.

Please refer to FIG. 3, which shows a flowchart diagram of a mutual-capacitance sensing method 300 according to an embodiment of the present invention. The mutual-capacitance sensing method is applicable to the touch sensitive processing apparatus 110 as shown in FIG. 1. Especially, the processor 114 is configured to execute multiple instructions compiled according to the mutual-capacitance sensing method to realize it.

Step 310: selecting N first electrodes which does not transmit driving signals.

Step 320: designating a new combination of (N−1) first electrodes among the N first electrodes.

Step 330: applying driving signals to the first electrodes in the combination to get i-th period one-dimension sensing information, where i is an integer ranged from 1 to N. In the step 330, the time length of transmitting driving signals by the driving circuit module 112 and sensing induced driving signals on second electrodes by the sensing circuit module 112 has characteristics as shown in the Table 2 embodiment.

In one embodiment, step 330 further comprises applying inversely driving signals in phase by one of the first electrodes which does not belong to the combination. The embodiments shown in Table 3 and Table 4 are instances.

Step 340: determining whether already applying driving signals N times to the first electrodes in the combination. If the result is no, the flow goes back to step 320. If the result is yes, the flow proceeds to step 350.

Step 350: calculating one-dimension sensing information with regard to the N first electrodes according to the N i-th period one-dimension sensing information gotten in step 330 executed in N times. If no inversely driving signals in phase are transmitted by one of the first electrodes which does not belong to the combination in step 330, the calculating recited in step 350 is performed according to the embodiments as shown in Table 1 or in Table 2. More precisely, the calculating may be performed according to the Equation (6). If inversely driving signals in phase are transmitted by one of the first electrodes which does not belong to the combination in step 330, the calculating recited in step 350 is performed according to the embodiments as shown in Table 3 or in Table 4. More precisely, the calculating may be performed according to the Equation (10).

Step 360: determining whether the touch screen is whole scanned. If the result is no, the flow goes back to step 310. If the result is yes, the flow proceeds to step 370.

Step 370: two-dimension sensing information is formed according to the one-dimension sensing information with regard to the N first electrodes. The one-dimension sensing information with regard to the N first electrodes in the two-dimension sensing information is arranged based on the positions of the N first electrodes.

Step 380: calculating touching or approximating event with regard to external conductive object based on the two-dimension sensing information.

Optional step 390: reporting the touching or approximating event to the host.

Figure 4:
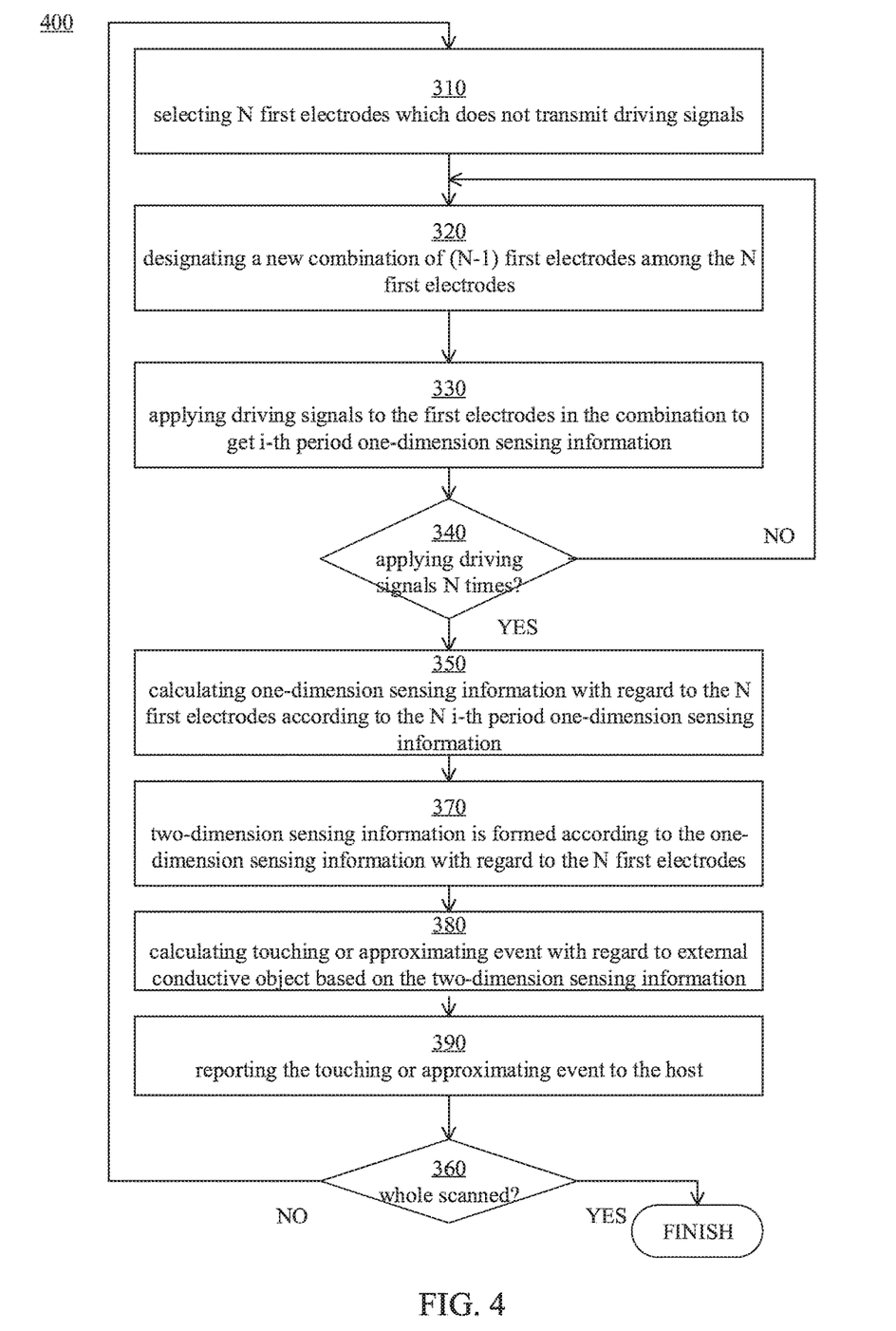
FIG. 4 is a flow chart diagram illustrates a mutual capacitance sensing method in accordance with another embodiment of the present application.

Please refer to FIG. 4, which shows a flowchart diagram of a mutual-capacitance sensing method 400 according to an embodiment of the present invention. The mutual-capacitance sensing method is applicable to the touch sensitive processing apparatus 110 as shown in FIG. 1. Especially, the processor 114 is configured to execute multiple instructions compiled according to the mutual-capacitance sensing method to realize it.

Comparing with the mutual-capacitance sensing method 300 as shown in FIG. 3, the mutual-capacitance sensing method 400 as shown in FIG. 4 is configured to retrieve two-dimension sensing information corresponding to various detection areas and to calculate and to report touching or approximating events in each detection area to the host. The e mutual-capacitance sensing method 300 as shown in FIG. 3 is configured to form one two-dimension sensing information corresponding to the whole touch screen and to calculate and to report touching or approximating events to the host. The embodiment as shown in FIG. 3 provides more accuracy of the touching and approximating events near the boundaries of two adjacent detection areas. However, it needs to preserve more one-dimension sensing information to calculate and to report in regard to the whole touch screen. The embodiment as shown in FIG. 4 provides detection to individual area. It does not need to collect information with regard to the whole touch screen before calculating and reporting.

According to an embodiment of the present invention, the present application provides a touch sensitive processing method, applicable to a touch panel including multiple first electrodes in parallel to a first direction and multiple second electrodes in parallel to a second direction, the touch sensitive processing method comprising: selecting a detection area which includes N of the first electrodes, where N is a positive integer larger than 2; repeating following steps N times: designating N−1 of the first electrodes among the N first electrodes as a i-th combination, where i is a positive integer ranged from 1 to N; simultaneously applying driving signals to the first electrodes designated as the i-th combination in a first time period; and retrieving i-th period one-dimension sensing information based on sensed induced driving signals of the second electrodes, wherein the i-th combination and a j-th combination are corresponding to different combination of the selected first electrodes, where j is a positive integer ranged from 1 to N, i does not equal to j; adding all of the i-th period one-dimension sensing information to generate one all-period one-dimension sensing information; and calculating a two-dimension sensing information according to the all-period one-dimension sensing information and all of the i-th period one-dimension sensing information.

In one embodiment, in order to detect a touching or approximating event only in the selected detection area, the touch sensitive processing method, further comprising: detecting whether a touching or approximating event exists on or near the touch panel including the selected N first electrodes, wherein the touching or approximating event is referred to an event that an external conductive object touches or approximates the touch panel, wherein the sensed induced driving signals of one of the second electrodes corresponding to the touching or approximating event is insufficient for detection of the touching or approximating event, if the driving signals applied to one of the first electrodes corresponding to the touching or approximating event in the first time period.

In one embodiment, in order to shorten detection time and to increase event report rate, the sensed induced driving signals of one of the second electrodes corresponding to the touching or approximating event is sufficient for detection of the touching or approximating event, if the driving signals applied to one of the first electrodes corresponding to the touching or approximating event in (N−1) multiple of the first time period.

In one embodiment, in order to detect all of the touching or approximating events on the whole touch panel, the touch sensitive processing method, further comprising: repeating the aforementioned steps, until all of the multiple first electrodes are selected in one of the detection area.

In one embodiment, in order to enhance or to decrease detection probability with regard to some area of the touch panel, to detect odd selected area remained in the touch panel, or to increase or to decrease the detection area, in a k-th selecting step, M of the first electrodes are selected to be included in another detection area, where M is a positive integer larger than 2 and M does not equal to N.

In one embodiment, since the touching or approximating events are usually adjacent in time and spatial domain, in order to enhance detection probability with regard to a neighboring area corresponding to another touching or approximating event, the selected M of the first electrodes in the k-th selecting step is corresponding to another touching or approximating event which is detected at a previous detection, where M is smaller than N.

In one embodiment, in order to detect touching or approximating events on the whole touch panel, especially for those are located near the boundaries of two adjacent detection areas, the touch sensitive processing method further comprising: repeating the aforementioned steps to retrieve multiple of the calculated two-dimension sensing information; calculating a whole touch panel two-dimension sensing information corresponding to the touch panel according to the multiple two-dimension sensing information and the selected N of the first electrodes corresponding to each of the two-dimension sensing information; and detecting whether a touching or approximating event exists on or near the touch panel according to the whole touch panel two-dimension sensing information.

In one embodiment, in order to prevent continuous electromagnetic interferences to adjacent areas, the i-th first electrode undesignated in the i-th combination is not adjacent to the (i+1)-th first electrode undesignated in the (i+1)-th combination.

In one embodiment, in order to prevent generating periodical electromagnetic interferences, the designating N−1 of the first electrodes is done randomly.

In one embodiment, in order to generate sensing values corresponding to driving signals emitted by each of the first electrodes, sensing information, in the two-dimension sensing information, corresponding to the i-th first electrode is related to a difference between corresponding values of the all-period one-dimension sensing information and a quotient, wherein the corresponding quotient is resulted from dividing the (N−i+1)-th period one-dimension sensing information by (N−1).

In one embodiment, in order to generate sensing values corresponding to driving signals emitted by each of the first electrodes, the applying step further comprising: applying second driving signals to one of the first electrodes which is not designated as the i-th combination in the first time period, wherein sensing information, in the two-dimension sensing information, corresponding to the i-th first electrode is related to a product of (N−2)/N and a difference, where the corresponding difference is resulted from subtracting the all-period one-dimension sensing information by the (N−i+1)-th period one-dimension sensing information, wherein the second driving signals are inversed phase version of the driving signals.

According to an embodiment of the present invention, a touch sensitive processing apparatus is provided. The touch sensitive processing apparatus is configured for controlling a touch panel, which includes multiple first electrodes in parallel to a first direction and multiple second electrodes in parallel to a second direction. The touch sensitive processing apparatus comprising: a driving circuit module; a sensing circuit module; an interconnection network module, which is configured to connect the driving circuit module to any one or more of the first electrodes and to connect the sensing circuit module to any one or more of the second electrodes; and a processor module, configured to execute programs stored in non-volatile memory to realize the following steps: selecting a detection area which includes N of the first electrodes, where N is a positive integer larger than 2; repeating following steps N times: designating N−1 of the first electrodes among the N first electrodes as a i-th combination, where i is a positive integer ranged from 1 to N; simultaneously applying, by the driving circuit module, driving signals to the first electrodes designated as the i-th combination in a first time period; and retrieving, by the sensing circuit module, i-th period one-dimension sensing information based on sensed induced driving signals of the second electrodes, wherein the i-th combination and a j-th combination are corresponding to different combination of the selected first electrodes, where j is a positive integer ranged from 1 to N, i does not equal to j; adding all of the i-th period one-dimension sensing information to generate one all-period one-dimension sensing information; and calculating a two-dimension sensing information according to the all-period one-dimension sensing information and all of the i-th period one-dimension sensing information.

In one embodiment, in order to detect a touching or approximating event only in the selected detection area, the processor module is further configured to execute program for detecting whether a touching or approximating event exists on or near the touch panel including the selected N first electrodes, wherein the touching or approximating event is referred to an event that an external conductive object touches or approximates the touch panel, wherein the sensed induced driving signals of one of the second electrodes corresponding to the touching or approximating event is insufficient for detection of the touching or approximating event, if the driving signals applied to one of the first electrodes corresponding to the touching or approximating event in the first time period.

In one embodiment, in order to shorten detection time and to increase event report rate, the sensed induced driving signals of one of the second electrodes corresponding to the touching or approximating event is sufficient for detection of the touching or approximating event, if the driving signals applied to one of the first electrodes corresponding to the touching or approximating event in (N−1) multiple of the first time period.

In one embodiment, in order to detect all of the touching or approximating events on the whole touch panel, the processor module is further configured to execute program for repeating the aforementioned steps, until all of the multiple first electrodes are selected in one of the detection area.

In one embodiment, in order to enhance or to decrease detection probability with regard to some area of the touch panel, to detect odd selected area remained in the touch panel, in a k-th selecting step, M of the first electrodes are selected to be included in another detection area, where M is a positive integer larger than 2 and M does not equal to N.

In one embodiment, since the touching or approximating events are usually adjacent in time and spatial domain, in order to enhance detection probability with regard to a neighboring area corresponding to another touching or approximating event, the selected M of the first electrodes in the k-th selecting step is corresponding to another touching or approximating event which is detected at a previous detection, where M is smaller than N.

In one embodiment, in order to detect touching or approximating events on the whole touch panel, especially for those are located near the boundaries of two adjacent detection areas, the processor module is further configured to execute program for repeating the aforementioned steps to retrieve multiple of the calculated two-dimension sensing information; calculating a whole touch panel two-dimension sensing information corresponding to the touch panel according to the multiple two-dimension sensing information and the selected N of the first electrodes corresponding to each of the two-dimension sensing information; and detecting whether a touching or approximating event exists on or near the touch panel according to the whole touch panel two-dimension sensing information.

In one embodiment, in order to prevent continuous electromagnetic interferences to adjacent areas, the i-th first electrode undesignated in the i-th combination is not adjacent to the (i+1)-th first electrode undesignated in the (i+1)-th combination.

In one embodiment, in order to prevent generating periodical electromagnetic interferences, the designating N−1 of the first electrodes is done randomly.

In one embodiment, in order to generate sensing values corresponding to driving signals emitted by each of the first electrodes, sensing information, in the two-dimension sensing information, corresponding to the i-th first electrode is related to a difference between corresponding values of the all-period one-dimension sensing information and a quotient, wherein the corresponding quotient is resulted from dividing the (N−i+1)-th period one-dimension sensing information by (N−1).

In one embodiment, in order to generate sensing values corresponding to driving signals emitted by each of the first electrodes, the applying step further comprising: applying second driving signals to one of the first electrodes which is not designated as the i-th combination in the first time period, wherein sensing information, in the two-dimension sensing information, corresponding to the i-th first electrode is related to a product of (N−2)/N and a difference, where the corresponding difference is resulted from subtracting the all-period one-dimension sensing information by the (N−i+1)-th period one-dimension sensing information, wherein the second driving signals are inversed phase version of the driving signals.

According to one embodiment of the present invention, a touch sensitive system provided by the present application comprising: the aforementioned touch panel and the touch sensitive processing apparatus.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing method, applicable to a touch panel including multiple first electrodes in parallel to a first direction and multiple second electrodes in parallel to a second direction, the touch sensitive processing method comprising:
  selecting a detection area which includes N of the first electrodes, where N is a positive integer larger than 2;
  repeating following steps N times:
    designating N−1 of the first electrodes among the N first electrodes as a i-th combination, where i is a positive integer ranged from 1 to N;
    simultaneously applying driving signals to the first electrodes designated as the i-th combination in a first time period; and
    retrieving i-th period one-dimension sensing information based on sensed induced driving signals of the second electrodes, wherein the i-th combination and a j-th combination are corresponding to different combination of the selected first electrodes, where j is a positive integer ranged from 1 to N, i does not equal to j;
  adding all of the i-th period one-dimension sensing information to generate one all-period one-dimension sensing information; and
  calculating a two-dimension sensing information according to the all-period one-dimension sensing information and all of the i-th period one-dimension sensing information.

2. The touch sensitive processing method of claim 1, further comprising:
  detecting whether a touching or approximating event exists on or near the touch panel including the selected N first electrodes, wherein the touching or approximating event is referred to an event that an external conductive object touches or approximates the touch panel,
  wherein the sensed induced driving signals of one of the second electrodes corresponding to the touching or approximating event is insufficient for detection of the touching or approximating event, if the driving signals applied to one of the first electrodes corresponding to the touching or approximating event in the first time period.

3. The touch sensitive processing method of claim 2, wherein the sensed induced driving signals of one of the second electrodes corresponding to the touching or approximating event is sufficient for detection of the touching or approximating event, if the driving signals applied to one of the first electrodes corresponding to the touching or approximating event in (N−1) multiple of the first time period.

4. The touch sensitive processing method of claim 1, further comprising:
  repeating the steps recited in claim 1, until all of the multiple first electrodes are selected in one of the detection area.

5. The touch sensitive processing method of claim 4, wherein in a k-th selecting step, M of the first electrodes are selected to be included in another detection area, where M is a positive integer larger than 2 and M does not equal to N.

6. The touch sensitive processing method of claim 5, wherein the selected M of the first electrodes in the k-th selecting step is corresponding to another touching or approximating event which is detected at a previous detection, where M is smaller than N.

7. The touch sensitive processing method of claim 4, further comprising:
  repeating the steps recited in claim 1 to retrieve multiple of the calculated two-dimension sensing information;
  calculating a whole touch panel two-dimension sensing information corresponding to the touch panel according to the multiple two-dimension sensing information and the selected N of the first electrodes corresponding to each of the two-dimension sensing information; and
  detecting whether a touching or approximating event exists on or near the touch panel according to the whole touch panel two-dimension sensing information.

8. The touch sensitive processing method of claim 1, wherein the i-th first electrode undesignated in the i-th combination is not adjacent to the (i+1)-th first electrode undesignated in the (i+1)-th combination.

9. The touch sensitive processing method of claim 1, wherein the designating N−1 of the first electrodes is done randomly.

10. The touch sensitive processing method of claim 1, wherein sensing information, in the two-dimension sensing information, corresponding to the i-th first electrode is related to a difference between corresponding values of the all-period one-dimension sensing information and a quotient, wherein the corresponding quotient is resulted from dividing the (N−i+1)-th period one-dimension sensing information by (N−1).

11. The touch sensitive processing method of claim 1, wherein the applying step further comprising:
applying second driving signals to one of the first electrodes which is not designated as the i-th combination in the first time period,
wherein sensing information, in the two-dimension sensing information, corresponding to the i-th first electrode is related to a product of (N−2)/N and a difference, where the corresponding difference is resulted from subtracting the all-period one-dimension sensing information by the (N−i+1)-th period one-dimension sensing information,
wherein the second driving signals are inversed phase version of the driving signals.

12. A touch sensitive processing apparatus configured for controlling a touch panel, which includes multiple first electrodes in parallel to a first direction and multiple second electrodes in parallel to a second direction, the touch sensitive processing apparatus comprising:
a driving circuit module;
a sensing circuit module;
an interconnection network module, which is configured to connect the driving circuit module to any one or more of the first electrodes and to connect the sensing circuit module to any one or more of the second electrodes; and
a processor module, configured to execute programs stored in non-volatile memory to realize the following steps:
selecting a detection area which includes N of the first electrodes, where N is a positive integer larger than 2;
repeating following steps N times:
designating N−1 of the first electrodes among the N first electrodes as a i-th combination, where i is a positive integer ranged from 1 to N;
simultaneously applying, by the driving circuit module, driving signals to the first electrodes designated as the i-th combination in a first time period; and
retrieving, by the sensing circuit module, i-th period one-dimension sensing information based on sensed induced driving signals of the second electrodes, wherein the i-th combination and a j-th combination are corresponding to different combination of the selected first electrodes, where j is a positive integer ranged from 1 to N, i does not equal to j;
adding all of the i-th period one-dimension sensing information to generate one all-period one-dimension sensing information; and
calculating a two-dimension sensing information according to the all-period one-dimension sensing information and all of the i-th period one-dimension sensing information.

13. The touch sensitive processing apparatus of claim 12, wherein the processor module is further configured to execute program for
detecting whether a touching or approximating event exists on or near the touch panel including the selected N first electrodes, wherein the touching or approximating event is referred to an event that an external conductive object touches or approximates the touch panel,
wherein the sensed induced driving signals of one of the second electrodes corresponding to the touching or approximating event is insufficient for detection of the touching or approximating event, if the driving signals applied to one of the first electrodes corresponding to the touching or approximating event in the first time period.

14. The touch sensitive processing apparatus of claim 13, wherein the sensed induced driving signals of one of the second electrodes corresponding to the touching or approximating event is sufficient for detection of the touching or approximating event, if the driving signals applied to one of the first electrodes corresponding to the touching or approximating event in (N−1) multiple of the first time period.

15. The touch sensitive processing apparatus of claim 12, wherein the processor module is further configured to execute program for
repeating the steps recited in claim 12, until all of the multiple first electrodes are selected in one of the detection area.

16. The touch sensitive processing apparatus of claim 15, wherein in a k-th selecting step, M of the first electrodes are selected to be included in another detection area, where M is a positive integer larger than 2 and M does not equal to N.

17. The touch sensitive processing apparatus of claim 16, wherein the selected M of the first electrodes in the k-th selecting step is corresponding to another touching or approximating event which is detected at a previous detection, where M is smaller than N.

18. The touch sensitive processing apparatus of claim 15, wherein the processor module is further configured to execute program for
repeating the steps recited in claim 12 to retrieve multiple of the calculated two-dimension sensing information;
calculating a whole touch panel two-dimension sensing information corresponding to the touch panel according to the multiple two-dimension sensing information and the selected N of the first electrodes corresponding to each of the two-dimension sensing information; and
detecting whether a touching or approximating event exists on or near the touch panel according to the whole touch panel two-dimension sensing information.

19. The touch sensitive processing apparatus of claim 12, wherein the i-th first electrode undesignated in the i-th combination is not adjacent to the (i+1)-th first electrode undesignated in the (i+1)-th combination.

20. The touch sensitive processing apparatus of claim 12, wherein the designating N−1 of the first electrodes is done randomly.

21. The touch sensitive processing apparatus of claim 12, wherein sensing information, in the two-dimension sensing information, corresponding to the i-th first electrode is related to a difference between corresponding values of the all-period one-dimension sensing information and a quotient, wherein the corresponding quotient is resulted from dividing the (N−i+1)-th period one-dimension sensing information by (N−1).

22. The touch sensitive processing apparatus of claim 12, wherein the applying step further comprising:
applying second driving signals to one of the first electrodes which is not designated as the i-th combination in the first time period,
wherein sensing information, in the two-dimension sensing information, corresponding to the i-th first electrode is related to a product of (N−2)/N and a difference, where the corresponding difference is resulted from subtracting the all-period one-dimension sensing information by the (N−i+1)-th period one-dimension sensing information, wherein the second driving signals are inversed phase version of the driving signals.

23. A touch sensitive system comprising:

the touch panel and the touch sensitive processing apparatus recited in claim 12.

\* \* \* \* \*